United States Patent Office 3,169,340
Patented Feb. 16, 1965

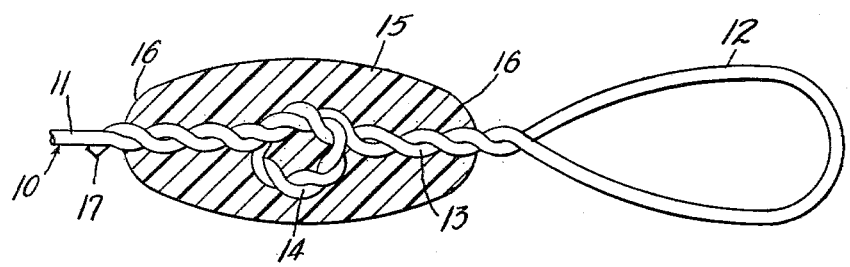
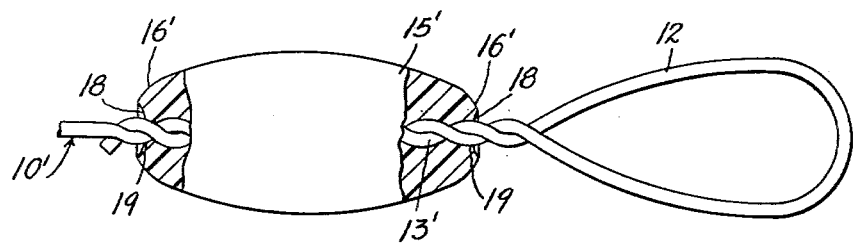

3,169,340
LOOPED SNELL FOR FISH HOOKS
Louis H. Morin, Bronx, N.Y. (125 Beechwood Ave., New Rochelle, N.Y.), assignor of one-fourth to Madeline F. McGill, Denver, Colo., and one-fourth to J. R. Hanna, Bronxville, N.Y.
Filed July 30, 1963, Ser. No. 298,611
2 Claims. (Cl. 43—44.98)

This invention relates to snells, to one end of which fish hooks are usually attached. More particularly, the invention deals with a snell of this type having a looped end in a monofilament snell strand, wherein the loop has a twisted and otherwise formed anchorage, the major portion of which is contained within an encapsulating element in securely maintaining the loop in operative position at all times.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged diagrammatic detail view of the looped end portion of a snell, illustrating, in section, the arrangement of an encapsulating element on the twisted and formed portion of the snell inwardly of and adjacent the loop; and FIG. 2 is a view, generally similar to FIG. 1, illustrating the encapsulating element partially in elevation and showing a modified form of element.

Considering FIG. 1 of the drawing, I have shown at 10 a monofilament snell strand composed of nylon or other similar material and such as commonly used in forming snelled fish hooks and at 11 is shown a short portion of the long tail, to the end of which the fish hook is usually attached. The other end portion of the strand is fashioned to form a relatively large loop 12, with which a fish line, leader or the like is usually attached. The strand, inwardly of the loop 12, is twisted, as seen as 13 and, intermediate ends of the twist, the twist is fashioned to form a ring-like anchorage member 14. This member can be formed in any desired way and one method of procedure would be to simply move the ends of the twist toward each other, which would automatically form the enlarged anchorage member 14.

At 15 I have shown an encapsulating element in the form of a molded body of suitable plastic material, such as nylon, Delrin and the like. The element 15 has rounded ends 16, which are disposed adjacent the ends of the twist 13, and the end of the strand 10 is indicated at 17.

The molded body 15 extends into the crevices of the twist 13 and the member 14 and securely retains the twist against untwisting or unravelling, thus maintaining the loop 12 in the formed position shown in FIG. 1 at all times.

In FIG. 2 of the drawing, I have shown a slight modification, wherein the twist 13' will be generally the same as 13 and includes a member, similar to the member 14 substantially centrally of the element 15'. 12' shows the loop and 10' shows the strand. In FIG. 2, it will be noted that the rounded ends 16' have formed recesses 18 therein produced in the molding operation of the element 15' to form a positive seal on the twisted portions 13, as at 19. Aside from this structural change, the looped snell of FIG. 2 is similar in all respects to the looped snell shown in FIG. 1 of the drawing.

Having fully described my invention, what I claim as new and desire to secure by Letters Patent is:

1. A monofilament strand having a loop end portion, the strand inwardly of the loop having a twist therein extending a predetermined length of the strand, an encapsulating element enveloping the major portion of the length of the twist in said strand in retaining the twisted portion of the strand against untwisting and in retaining the loop in operative position, end portions of the twist extending beyond ends of said element, the twisted portion including an enlarged anchorage member defined by a ring-like knot disposed within said element, said strand being formed of plastic material, and said element comprising a molded plastic body enveloping the anchorage member of said twist.

2. A monofilament strand having a loop end portion, the strand inwardly of the loop having a twist therein extending a predetermined length of the strand, an encapsulating element enveloping the major portion of the length of the twist in said strand in retaining the twisted portion of the strand against untwisting and in retaining the loop in operative position, end portions of the twist extending beyond ends of said element, the twisted portion including an enlarged anchorage member defined by a ring-like knot disposed within said element, said strand being formed of plastic material, said element comprising a molded plastic body enveloping the anchorage member of said twist, end portions of said element being rounded, and the ends of said element being shaped to effect a seal of the material of said element on the twist of the strand inwardly of said rounded ends.

References Cited by the Examiner
UNITED STATES PATENTS

| | | | |
|---|---|---|---|
| 769,356 | 9/04 | Reis | 43—43.1 |
| 2,577,466 | 12/51 | Jones | 43—44.98 |
| 2,672,704 | 3/54 | Smith | 43—43.1 |
| 2,683,306 | 7/54 | Brignall. | |

ABRAHAM G. STONE, *Primary Examiner.*